United States Patent
Pfau et al.

(10) Patent No.: US 10,549,488 B2
(45) Date of Patent: Feb. 4, 2020

(54) STRUCTURAL COMPONENT, METHOD FOR PRODUCING A STRUCTURAL COMPONENT, PRESSURE FUSELAGE FOR A VEHICLE COMPRISING A STRUCTURAL COMPONENT

(71) Applicant: Premium Aerotec GmbH, Augsburg (DE)

(72) Inventors: Reinald Pfau, Degerloch (DE); Jochen Scholler, Grossaitingen (DE); Bernhard Hoerger, Augsburg (DE); Thomas Drexl, Prittriching (DE)

(73) Assignee: Premium Aerotec GmbH (DE)

( * ) Notice: Subject to any disclaimer, the term of this patent is extended or adjusted under 35 U.S.C. 154(b) by 408 days.

(21) Appl. No.: 15/454,068

(22) Filed: Mar. 9, 2017

(65) Prior Publication Data
US 2017/0259511 A1    Sep. 14, 2017

(30) Foreign Application Priority Data

Mar. 10, 2016 (DE) .................. 10 2016 002 844

(51) Int. Cl.
| | |
|---|---|
| *B29C 70/30* | (2006.01) |
| *B29C 70/20* | (2006.01) |
| *B29C 70/08* | (2006.01) |
| *B32B 3/08* | (2006.01) |
| *B32B 5/12* | (2006.01) |

(Continued)

(52) U.S. Cl.
CPC .......... *B29C 70/207* (2013.01); *B29C 70/083* (2013.01); *B29C 70/30* (2013.01); *B32B 3/08* (2013.01); *B32B 5/12* (2013.01); *B32B 37/06* (2013.01); *B32B 37/10* (2013.01); *B32B 37/18* (2013.01); *B32B 38/1808* (2013.01); *B64C 1/06* (2013.01); *B29L 2031/3082* (2013.01); *B32B 2260/023* (2013.01); *B32B 2260/046* (2013.01); *B32B 2305/076* (2013.01);

(Continued)

(58) Field of Classification Search
CPC ............... B64C 1/10; B64C 2001/0072; B29L 2031/3082; B29C 70/30; Y10T 428/24099
USPC ........................................................ 244/119
See application file for complete search history.

(56) References Cited

U.S. PATENT DOCUMENTS

| | | | | |
|---|---|---|---|---|
| 4,578,303 A | * | 3/1986 | Kundinger | ................ E04C 2/36 428/116 |
| 6,378,805 B1 | | 4/2002 | Stephan et al. | |

(Continued)

FOREIGN PATENT DOCUMENTS

| | | |
|---|---|---|
| AT | 405 813 B | 11/1999 |
| DE | 19503939 C1 | 6/1996 |

(Continued)

*Primary Examiner* — Christopher P Ellis
(74) *Attorney, Agent, or Firm* — Lerner, David, Littenberg, Krumholz & Mentlik, LLP

(57) ABSTRACT

A structural component has a main body formed of a fibre composite material, a plurality of first reinforcement parts and a plurality of second reinforcement parts, wherein the main body is formed as a domed body having a peripheral edge and a vertex, wherein the first reinforcement parts are connected to the main body and in each case have a concave curvature course in relation to a first plane, and wherein the second reinforcement parts are connected to the main body and also have a concave curvature course in each case in relation to a second plane.

18 Claims, 5 Drawing Sheets

(51) Int. Cl.
*B32B 37/06* (2006.01)
*B32B 37/10* (2006.01)
*B32B 37/18* (2006.01)
*B32B 38/18* (2006.01)
*B64C 1/06* (2006.01)
B29L 31/30 (2006.01)
B64C 1/00 (2006.01)

(52) U.S. Cl.
CPC ....... *B32B 2305/08* (2013.01); *B32B 2305/20* (2013.01); *B32B 2605/18* (2013.01); *B64C 2001/0072* (2013.01)

(56) References Cited

U.S. PATENT DOCUMENTS

| | | | |
|---|---|---|---|
| 7,900,405 B1 * | 3/2011 | Jacoby | E04B 7/105 |
| | | | 210/163 |
| 8,302,910 B2 | 11/2012 | Klug et al. | |
| 9,187,168 B2 * | 11/2015 | Rosman | B64C 1/10 |
| 9,776,704 B1 * | 10/2017 | Rufino | B64C 1/10 |
| 10,384,759 B2 * | 8/2019 | Zuardy | B64C 1/064 |
| 2007/0164159 A1 * | 7/2007 | Koch | B64C 1/10 |
| | | | 244/121 |
| 2008/0173765 A1 * | 7/2008 | Muller | B64C 1/061 |
| | | | 244/158.1 |
| 2009/0137196 A1 | 5/2009 | Klug et al. | |
| 2010/0233421 A1 * | 9/2010 | Lind | E04B 1/19 |
| | | | 428/108 |
| 2012/0055617 A1 * | 3/2012 | Van Vuegt | B29C 70/446 |
| | | | 156/184 |
| 2014/0131513 A1 * | 5/2014 | Bjerkemo | B64C 7/00 |
| | | | 244/1 A |
| 2014/0370227 A1 * | 12/2014 | Diep | B64D 45/00 |
| | | | 428/66.4 |
| 2015/0037541 A1 | 2/2015 | Rosman et al. | |
| 2015/0144736 A1 * | 5/2015 | Joern | B64C 1/10 |
| | | | 244/119 |
| 2015/0231837 A1 * | 8/2015 | Georgeson | B32B 3/266 |
| | | | 428/136 |
| 2016/0257392 A1 * | 9/2016 | Orlov | B64C 1/069 |
| 2016/0288897 A1 * | 10/2016 | De Jong | B64F 5/00 |
| 2016/0340017 A1 * | 11/2016 | Jorn | B64C 1/10 |
| 2017/0137107 A1 * | 5/2017 | Zuardy | B64C 1/10 |
| 2018/0100776 A1 * | 4/2018 | Bernus | B64C 1/36 |
| 2019/0030841 A1 * | 1/2019 | Kuntz | B29C 70/56 |
| 2019/0070800 A1 * | 3/2019 | Blom-Schieber | B29C 70/386 |
| 2019/0210706 A1 * | 7/2019 | Zeeb | B64C 1/10 |

FOREIGN PATENT DOCUMENTS

| | | |
|---|---|---|
| DE | 10 2007 054 101 A1 | 5/2009 |
| DE | 10 2014 107 404 A1 | 11/2015 |
| DE | 10 2015 205 934 B3 | 9/2016 |

* cited by examiner

Detail Z:

A-A:

B-B:

STRUCTURAL COMPONENT, METHOD FOR PRODUCING A STRUCTURAL COMPONENT, PRESSURE FUSELAGE FOR A VEHICLE COMPRISING A STRUCTURAL COMPONENT

FIELD OF THE INVENTION

The present invention relates to a structural component, a method for producing a structural component and a pressure fuselage for a vehicle, in particular an aircraft or spacecraft, comprising a structural component.

BACKGROUND OF THE INVENTION

Pressure fuselages of vehicles, in particular aircraft, have a construction that is as pressure-tight as possible. An elongate body structure is formed which is closed in a pressure-tight manner at at least one end by a structural component.

US 2015/0037541 A1 discloses a pressure bulkhead for an aircraft fuselage, the pressure bulkhead being formed as a substantially spherical dome having a periphery and comprising reinforcement bands extending beyond the dome along geodetical lines between two points of the periphery.

BRIEF SUMMARY OF THE INVENTION

One idea of the present invention is to provide a structural component which, at a low component weight, has a high mechanical load-bearing capacity and can be produced in a simple and efficient manner, and a method for producing a structural component of this type.

Another idea of the present invention is furthermore to provide a pressure fuselage comprising a structural component of this type and to specify a use of a structural component of this type in a pressure fuselage of a vehicle.

According to a first aspect of the invention, a structural component comprising a main body formed of a fibre composite material, a plurality of first reinforcement parts and a plurality of second reinforcement parts is provided. The main body is formed as a domed body having a peripheral edge and a vertex. The first reinforcement parts are connected to the main body and extend in each case between two points of a first pair of points located on the peripheral edge so as to be spaced apart in a component peripheral direction in such a way that said parts have, in each case, a concave curvature course in relation to a first plane which extends in a first curvature direction produced on the vertex and through the curvature centre point thereof and of the vertex. The second reinforcement parts are connected to the main body and extend in each case between two points of a second pair of points located in the peripheral edge so as to be spaced apart in the component peripheral direction in such a way that said parts have a concave curvature course in relation to a second plane which extends in a second curvature direction produced on the vertex and through the curvature centre point thereof and of the vertex.

Arranging the reinforcement parts in such a way that they extend concavely in relation to the first or second plane, as described above, has the advantage that, with a given maximum surface area of fields of the main body delimited by reinforcement parts and optionally by the peripheral edge of the main body, fields having a large surface area can also be achieved in the edge region of the main body. The number of reinforcement parts which are necessary overall so that none of the fields exceeds the maximum surface area is thus reduced. At the same time, the mechanical loading is thus distributed more uniformly over the individual reinforcement parts of the plurality of first reinforcement parts and the plurality of second reinforcement parts. Thus, the structural component according to the invention has a particularly high mechanical stability at a low weight.

Fields may in general be delimited by one or more of the following components: first reinforcement parts, second reinforcement parts, peripheral edge of the main body. Optionally present vertex reinforcement parts, which will be discussed in more detail below, are formed by first or second reinforcement parts.

The reinforcement parts or reinforcement strips are generally formed as elongate components, for example may have a trapezoidal, rectangular, semi-circular, elliptical, V-shaped, T-shaped or similar cross section.

The vertex of the main body may, for example, be provided by the centroid of one of the surfaces of the main body forming the domed shape of the main body. It is also conceivable to define the vertex as the point of one of the surfaces of the main body forming the domed shape of the main body which has the smallest spacing from the centre of mass of the main body. Furthermore, the vertex can also be selected as one of those points of the surface of the main body forming the domed shape of the main body at which one of these surfaces has a maximum or a minimum curvature. In particular, the vertex may lie on an intersecting line of a plane of symmetry of the main body with one of the surfaces of the main body forming the domed shape of the main body. For example, the vertex may lie on an intersection point of second intersecting lines of planes of symmetry of the main body with one of the surfaces of the main body forming the domed shape of the main body.

The main body may for example have at least one plane of symmetry. In this case, the first and/or the second plane is advantageously identical to one of the planes of symmetry. This results in a construction that is particularly favourable for the mechanical stability of the structural component.

Furthermore, it may be provided for a first vertex reinforcement part, which is formed by one of the plurality of first reinforcement parts, to extend through the vertex of the main body and for a second vertex reinforcement part, which is formed by one of the plurality of second reinforcement parts, to extend through the vertex of the main body. As a result, a particularly high mechanical stability of the structural component is achieved.

The first curvature direction may be the first main curvature direction produced at the vertex and the second curvature direction may be the second main curvature direction produced at the vertex.

In particular, it may be provided for the first and the second reinforcement parts to have, in each case, a concave curvature course in relation to the first and the second plane such that two of a plurality of fields of the structural component in each case, which fields are in each case delimited by two second and two first reinforcement parts, in each case have surface areas which differ from one another by at most 15 percent, or by at most 10 percent, or by at most 5 percent. In the case of such deviations of the surface areas from one another, a minimum number of reinforcement parts can be used with a given size of the structural component and with a given maximum permissible surface area of the fields, as a result of which an extremely low component weight is achieved.

The first and the second reinforcement parts are for example formed in each case of at least one fibre composite strip. In particular, it may be provided for one first or second reinforcement part from the plurality of first or second reinforcement parts to be formed by a plurality of fibre composite strips, known as tows, resting on one another. For example, up to 80 tows can be stacked on top of one another. The tows typically have a width in a range between 1.5 mm and 20 mm, or in a range between 5 mm and 18 mm or between 10 mm and 15 mm. The structural component may, for example, have a thickness in a range between 2 mm and 8 mm in the region of a reinforcement part and, for example, between 1.5 mm and 5 mm in a region without a reinforcement part. Within the aforementioned ranges, a particularly light-weight structural component is produced having good mechanical properties.

The main body for example has at least two fibre composite material layers. In this case, it may in particular be provided for the fibre composite material layers of the main body to be formed in each case by a plurality of fibre composite strips extending in a strip longitudinal direction, the strip longitudinal direction of the fibre composite strips of a first fibre composite material layer extending obliquely or perpendicularly, generally transversely, to the strip longitudinal direction of the fibre composite strips of an adjacent fibre composite layer.

It may furthermore be provided for the reinforcement parts to be embedded between two fibre composite layers at least in part. As an alternative to this, the reinforcement parts may be arranged on a first and/or a second surface of the main body. The first surface and the second surface are oriented in the opposite direction from one another. One of the surfaces is for example convexly curved and the other one is concavely curved with the result that, for example, a dome-shaped or generally domed main body is defined.

The structural component may, in particular, have a peripheral terminal part which extends along the peripheral edge of the main body and is connected thereto in such a way that the peripheral edge of the main body is located within the peripheral terminal part in relation to a width of said peripheral terminal part, so the peripheral terminal part forms an edge of the structural component.

If the peripheral edge of the main body is located within the peripheral terminal part, the structural component can advantageously be formed so as to have a constant thickness in the region of the peripheral terminal part. Different thicknesses of the structural component, which are produced in the region of the reinforcement parts and in regions without reinforcement parts, are thus compensated by means of the peripheral terminal part. The structural component is thus easy to mount on a body structure, in particular on a pressure fuselage.

According to the invention, a method for producing a structural component is also provided. The method has, in particular, the following steps:

Forming a semi-finished product arrangement by laying a fibre composite material semi-finished product, which comprises a fibre layer pre-impregnated with a matrix material, on a contour surface of a tool part, the surface course of which contour surface is such that the fibre composite material semi-finished product forms a domed main body arrangement having a peripheral edge and a vertex, laying a plurality of first reinforcement parts on the fibre composite material in such a way that said parts extend, in each case, between two points of a first pair of points located in the peripheral edge so as to be spaced apart in a component peripheral direction in such a way that said parts have, in each case, a concave curvature course in relation to a first plane which extends in a first curvature direction produced at the vertex and through the curvature centre point thereof, and laying a plurality of second reinforcement parts on the fibre composite material in such a way that said parts extend, in each case, between two points of a second pair of points located in the peripheral edge so as to be spaced apart in a component peripheral direction in such a way that said parts have a concave curvature course in relation to a second plane which extends in a second curvature direction produced at the vertex and through the curvature centre point thereof, and heating the semi-finished product arrangement under the application of pressure, and thereby hardening the matrix material to form a main body from the fibre composite semi-finished product and to connect the first and second reinforcement parts to the main body.

It may also be provided in the method that, when forming the semi-finished product arrangement, after laying on the second reinforcement parts a further fibre composite material semi-finished product is laid on.

It may furthermore be provided for the fibre composite material semi-finished product to be laid on by consecutively arranging at least two fibre composite material layers on the contour surface of the tool part. In this case, the fibre composite material layers are advantageously arranged in that a first fibre composite material layer is formed by unrolling a plurality of fibre composite strips in a strip longitudinal direction, and at least one further fibre composite material layer follows this first fibre composite material layer by unrolling a plurality of fibre composite strips in such a way that the strip longitudinal direction of the fibre composite strips from the further fibre composite layer extends in each case obliquely, at a right-angle or in general transversely to the strip longitudinal direction of the fibre composite strips of the adjacent fibre composite material layer.

In general, it may also be provided in the method for the plurality of first reinforcement parts and the plurality of second reinforcement parts to be laid on by unrolling at least one fibre composite strip on the fibre composite material semi-finished product.

The fibre composite strips mentioned in relation to the method may in general be constructed in an identical manner to the fibre composite strips disclosed in relation to the structural component, here in particular in relation to the reinforcement parts.

According to the invention, a pressure fuselage comprising a structural component according to any of the embodiments described above is furthermore provided. The pressure fuselage may, in particular, be the pressure fuselage of a vehicle, in particular of an aircraft, a spacecraft, a watercraft, in particular a submarine, or a road, rail or amphibian vehicle. The pressure fuselage may also be installed in a stationary facility, for example in a building or construction. In general, the pressure fuselage defines an interior in which a constant pressure can be set, the pressure prevailing in the interior being different from one in the environment surrounding the pressure fuselage.

In this case, the structural component may be connected to the body structure of a vehicle by means of linking components. For example, the structural component may be attached to a pressure fuselage of an aircraft as what is known as a pressure bulkhead.

A "fibre composite material" is generally understood here as a material having at least one layer of for example thread-like reinforcement fibres, for example carbon, glass, ceramic, aramid, boron, mineral, natural or synthetic fibres or mixtures thereof, the at least one layer of reinforcement fibres being embedded in a matrix material, for example a thermosetting, thermoplastic, elastomeric resin or in general a synthetic or natural resin or the like.

A "domed body" is generally understood here as a body or a component having at least one first surface and one second surface oriented in the opposite direction thereto, the first and/or the second surface extending in each case in a curved manner in at least one direction, in particular a centre line of the body or the component having a curved course, the centre line, in a cross section perpendicular to one of the surfaces and in a curvature direction thereof, being the number of points which, in the cross section, have the same spacing from a point on the first surface and a point on the second surface in each case, the respective points on the first surface and the second surface being points having the smallest possible spacing from one another. By way of example, a domed surface is understood here as a body that is dome-shaped, spherical, parabolic or shell-shaped at least in part.

A "curvature centre point" is generally understood here as a centre point of a circle having a radius which best approaches the curvature of an area in a curvature direction at a specific point of the area or the curvature of a curve at a specific point of the curve.

In relation to direction specifications and axes, in particular to direction specifications and axes relating to the course of physical structures, a course of an axis, a direction or a structure "transverse" to another axis, direction or structure is understood here such that these, in particular the tangents produced in a particular point of the structures, extend in each case at an angle of greater than or equal to 45 degrees, or greater than or equal to 60 degrees or perpendicular to one another.

BRIEF DESCRIPTION OF THE DRAWINGS

The invention will be described below with reference to the figures of the drawings. In the figures.

In the figures, the same reference signs designate the same or functionally like components, if nothing is stated to the contrary.

DETAILED DESCRIPTION

Figure 1:
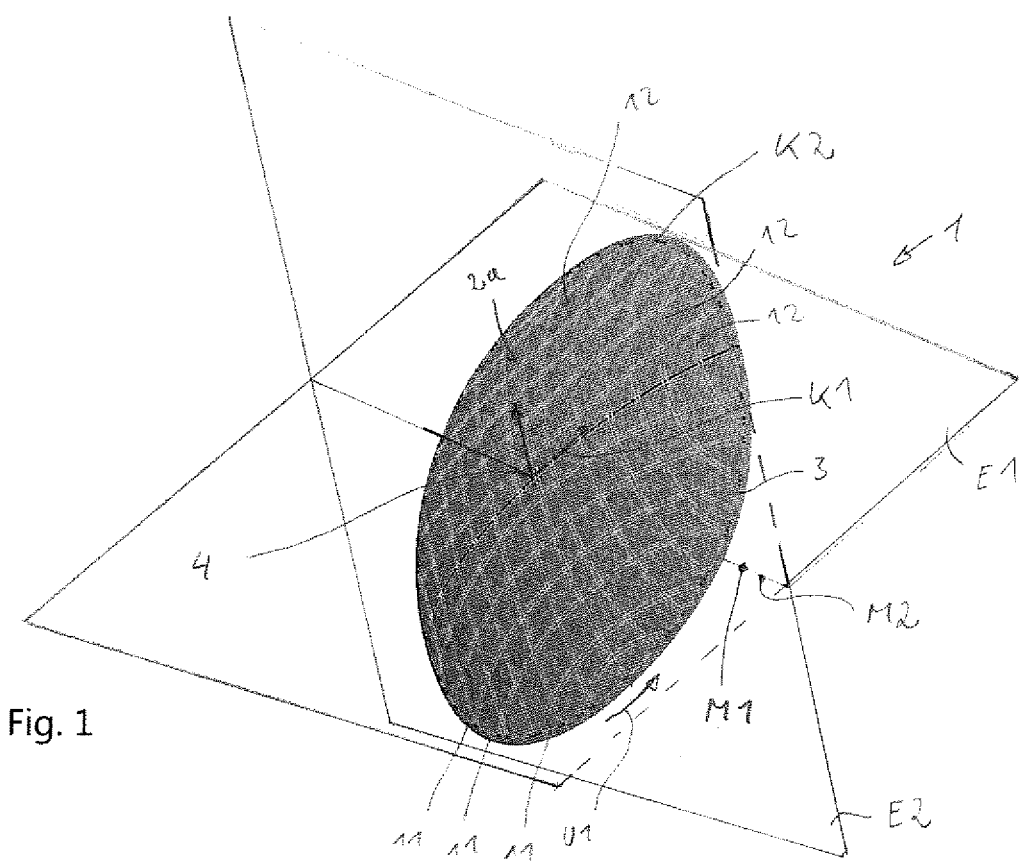
FIG. 1 is a perspective view of a structural component according to an embodiment of the present invention.

FIG. 1 shows a structural component 1 according to an embodiment of the present invention. The structural component 1 has a main body 2 which is formed of a fibre composite material. The main body 2 is generally formed as a domed body having a peripheral edge 3 and a vertex 4 and in particular comprises a first surface 2a and a second surface 2b oriented in the opposite direction thereto. In the embodiment shown in FIG. 1, the first surface 2a is convexly curved and the second surface 2b is concavely curved.

Figure 2:
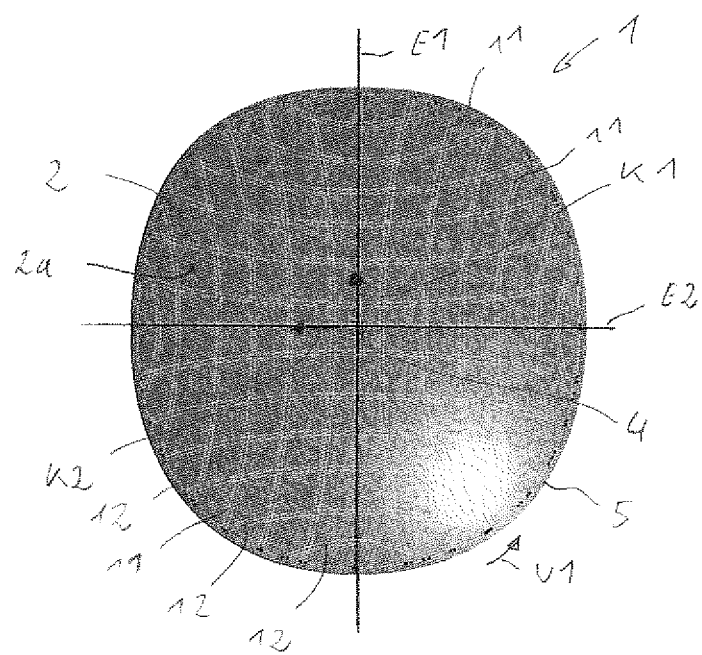
FIG. 2 is a plan view of a first surface of the structural component shown in FIG. 1.
Figure 3:
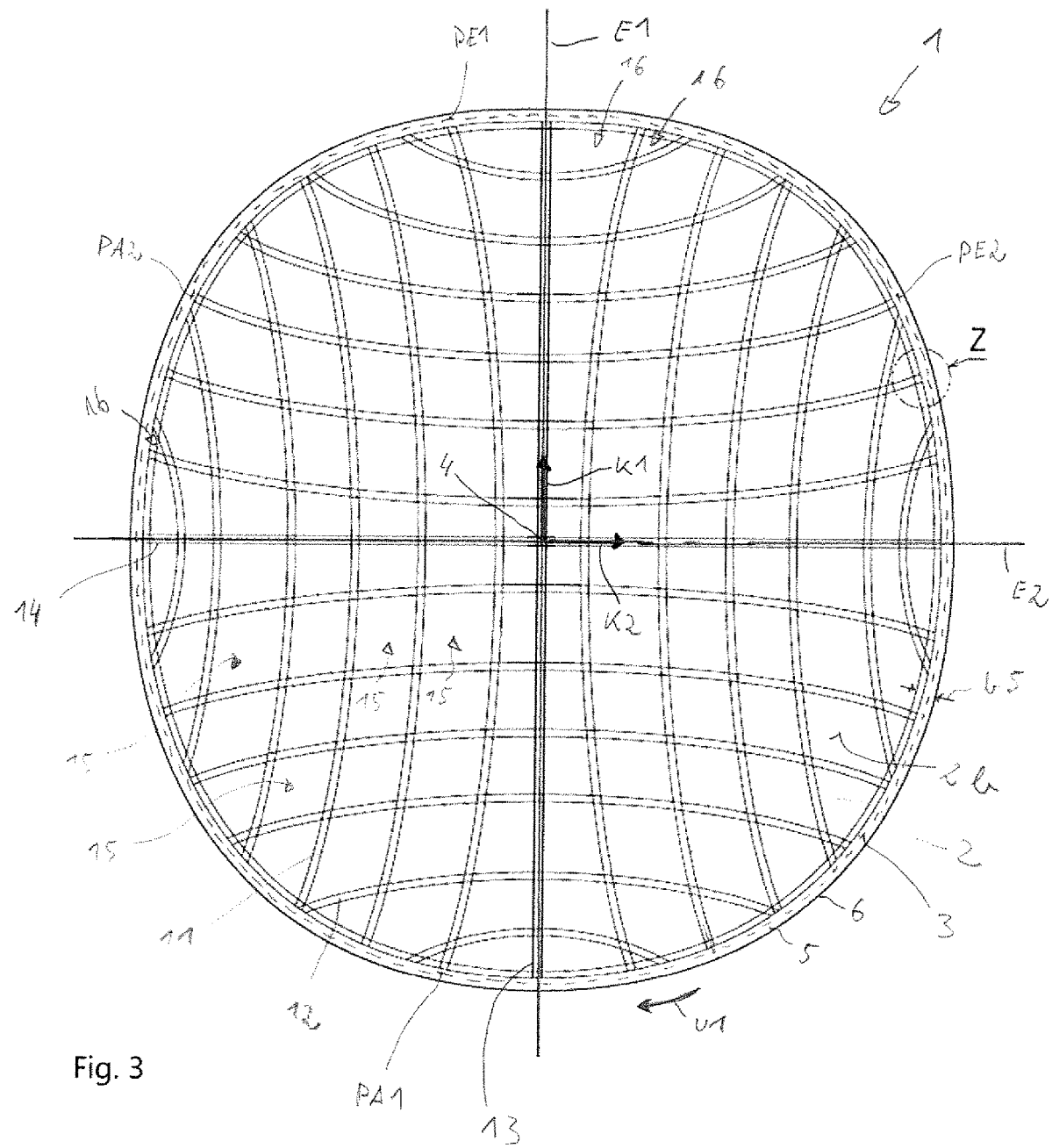
FIG. 3 is a plan view of a second surface of the structural component shown in FIG. 1, which is oriented in the opposite direction to the first surface.

FIGS. 1 to 3 show, by way of example, a main body 2 which has a symmetrical dome-like shape. A shaping of this type provides high mechanical stability, in particular when pressure is applied to the second surface 2a. However, in general, non-symmetrically shaped main bodies 2 are also conceivable.

The vertex 4 of the main body 2 may, for example, be provided by the centroid of the first or second surface 2a, 2b of the main body 2. It is also conceivable to define the vertex 4 as the point of the first or the second surface 2a, 2b of the main body 2 which has the smallest spacing from the centre of mass of the main body. Furthermore, the vertex 4 may also be selected as one of those point of the first or the second surface 2a, 2b of the main body 2 at which the first or the second surface 2a, 2b has a maximum or a minimum curvature. In particular, the vertex 4 may lie on an intersecting line of a plane of symmetry of the main body 2 with the first or the second surface 2a, 2b of the main body 2 and may particularly for example lie on an intersection point of second intersecting lines of planes of symmetry of the main body 2 with the first or the second surface 2a, 2b of the main body 2.

At the vertex 4, the first or the second surface 2a, 2b of the main body 2 may be curved at least in one curvature direction. The curvature may also be zero at the vertex. In general, a first curvature direction K1 and a second curvature direction K2, which are produced from the curvature of the first or the second surface 2a, 2b, may be defined at the vertex.

If the first and/or the second surface 2a, 2b of the main body 2 is curved at the vertex 4 in at least two directions, a first curvature direction K1 may be selected to extend in one of the directions in which one of the surfaces 2a, 2b is curved at the vertex. A second curvature direction K2 may be selected to extend at an angle to the first curvature direction K1.

If the first and the second surface 2a, 2b of the main body 2 at the vertex 4 extend in a curved manner only in one direction, the first curvature direction K1 may be provided by this direction. A second curvature direction K2 may be selected to extend at an angle, for example perpendicularly to the first curvature direction K1.

If, at the vertex 4, the curvature of the first and the second surface 2a, 2b of the main body 2 is zero, the first curvature direction K1 may be selected to extend basically as desired, for example along a line of symmetry or axis of symmetry. The second curvature direction K2 may be selected to extend at an angle, for example perpendicularly to the first curvature direction K1.

The first curvature direction K1 may in general be the first main curvature direction produced at the vertex 4 and the second curvature direction K2 may be the second main curvature direction produced at the vertex 4. In this case, the first and the second curvature direction K1 and K2 extend perpendicularly to one another.

In general, the first curvature direction K1 may be transverse and, in particular, perpendicular to a mechanical main load direction.

As FIGS. 1 to 3 show, the structural component 1 has a plurality of first reinforcement parts 11 and a plurality of second reinforcement parts 12, the reinforcement parts 11, 12 in each case being connected to the main body 2. In general, the first reinforcement parts 11 extend transversely or obliquely to the second reinforcement parts 12. In particular, it may be provided for one first reinforcement part 11 and one second reinforcement part 12 to only intersect at one point in each case.

As can be seen in particular in FIG. 3, the first reinforcement parts 11 in each case extend between two points PA1, PE1 of a first pair of points located at the peripheral edge 3 of the main body 2 so as to be spaced apart in a component peripheral direction U1. The first reinforcement parts 11 extend between the points PA1, PE1 in such a way that they in each case have a concave curvature course in relation to a first plane E1. The first plane E1 extends in the first curvature direction K1 produced at the vertex 4 and through the curvature centre point M1 thereof and of the vertex 4.

Furthermore, the second reinforcement parts 12 also extend, in each case, between two points PA2, PE2 of a second pair of points located in the peripheral edge 3 so as to be spaced apart in the component peripheral direction U1. The second reinforcement parts 12 extend between the points PA2, PE2 in such a way that said parts have a concave curvature course in relation to a second plane E2. The second plane E2 extends in the second curvature direction K2 produced at the vertex 4 and through the curvature centre point M2 thereof and of the vertex.

The plane E1 is in particular defined by the first curvature direction K1 at the vertex 4 and a first radius vector, the direction of which is defined by the curvature centre point M1 of the vertex 4 and the first curvature direction K1, and the vertex 4. The plane E2 is in particular defined by the second curvature direction K2 at the vertex 4 and a second radius vector, the direction of which is defined by the curvature centre point M2 of the vertex 4 and the second curvature direction K2, and the vertex 4.

A concave course of the reinforcement parts 11, 12 in relation to the planes E1, E2 may, for example, be understood to mean that, in a viewing direction in the plane E1, E2, i.e. in each case in the direction of the first or second radius vector, and perpendicularly to the associated curvature direction K1, K2, the first and second reinforcement parts 11, 12 extend concavely to the planes E1, E2, as is clear in particular from FIGS. 2 and 3.

A concave course of the reinforcement parts 11, 12 in relation to the planes E1, E2 may, for example, also be understood to mean that the reinforcement parts 11, 12, in a viewing direction in the plane E1, E2, extend along a curved line, for each point of this curved line, the curvature centre point belonging in each case to this point being located on an opposing side of the line, like the plane E1 or E2. In other words, the curvature centre point of a point of the curved line and the relevant plane E1, E2 are located on opposing sides of the curved line, as is clear in particular from FIGS. 2 and 3.

Furthermore, a concave course of the reinforcement parts 11, 12 in relation to the planes E1, E2 can also be understood to mean that the reinforcement parts 11, 12, at each point that is located inside the peripheral edge 3 of the main body, have a smaller normal spacing from the plane E1 or E2 than a connecting line extending geodetically between the points PA1, PE1 or between the points PA2, PE2.

It may for example be provided for the reinforcement parts 11, 12 to extend on the main body 2 along section lines produced when the main body 2 is intersected by a cylinder having an elliptical cross section. In this case, the centre axis of the elliptical cylinder is for example located outside the main body 2 and may in particular extend in parallel with the first or the second direction vector. In the embodiment of the structural component 1 shown in FIGS. 1 to 6, the reinforcement parts 11, 12 in each case extend along section lines of this type, according to this example the radius of the elliptical cylinder reducing with an increasing spacing of the respective reinforcement parts 11, 12 from the plane E1 or E2, and the axis of the cylinder extending in parallel with the first and the second connection vector.

The points PA1, PE1 of the first pair of points are both located in each case on the same side of the plane E1 and for example in each on different sides of the plane E2. The points PA2, PE2 of the second pair of points are both located in each case on the same side of the plane E2 and for example in each case on different sides of the plane E1. This is shown by way of example in FIG. 3.

Arranging the reinforcement parts 11, 12 in such a way that they extend concavely in relation to the respective planes E1 and E2, as described above, has the advantage that, with a given maximum surface area of fields 15, 16 of the main body 2 delimited by reinforcement parts 11, 12 and optionally by the peripheral edge 3 of the main body, fields 15, 16 having a large surface area can also be achieved in the edge region of the main body 2. The number of reinforcement parts 11, 12 which are necessary overall so that none of the fields 15, 16 exceeds the maximum surface area, is thus reduced. At the same time, the mechanical loading is thus distributed more uniformly over the individual reinforcement parts of the plurality of first reinforcement parts 11 and the plurality of second reinforcement parts 12. Therefore, the structural component 1 according to the invention has a particularly high mechanical stability at a low weight.

Owing to the above-described concave course of the individual first and second reinforcement parts 11, 12 in relation to the planes E1, E2, the radius of curvature of said parts is relatively large. The reinforcement parts 11, 12 are therefore not very greatly curved, which is favourable with respect to the mechanical stability and, in particular, with respect to the manufacture of the structural component. The aspect last mentioned will be discussed in more detail below.

As shown in FIGS. 1 to 3, the structural component 1 may have a first vertex reinforcement part 13 which extends through the vertex 4 of the main body 2, and a second vertex reinforcement part 14 which also extends through the vertex 4 of the main body 2. The first vertex reinforcement part 13 is formed by one of the plurality of first reinforcement parts 11, and the second vertex reinforcement part 14 is formed by one of the plurality of second reinforcement parts 12. In particular, it may be provided for the first vertex reinforcement part 13 to extend in the first plane E1 and for a second vertex reinforcement part 14 to extend in the second plane E2.

It is for example provided for the first and the second reinforcements parts 11, 12 to in each case have a concave curvature course in relation to the first and the second plane E1, E2 in such a way that, in each case, two of a plurality of fields 15 of the structural component 1 in each case have surface areas which differ from one another by a predetermined amount, for example by at most 15 percent, or by at most 10 percent, or by at most 5 percent. The fields 15 are delimited here by two second and two first reinforcement parts in each case. In this manner, with a given size of the structural component 1 and with a given maximum permissible surface area of the fields 15, a minimum number of reinforcement parts 11, 12 can be used, as a result of which an extremely low component weight is achieved.

Figure 5:
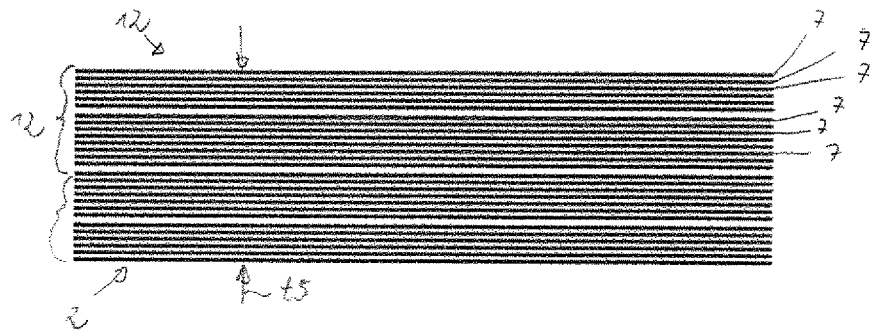
FIG. 5 is a sectional view of the embodiment of the structural component according to the invention, which is produced in a section along the line A-A drawn in FIG. 4.
Figure 6:
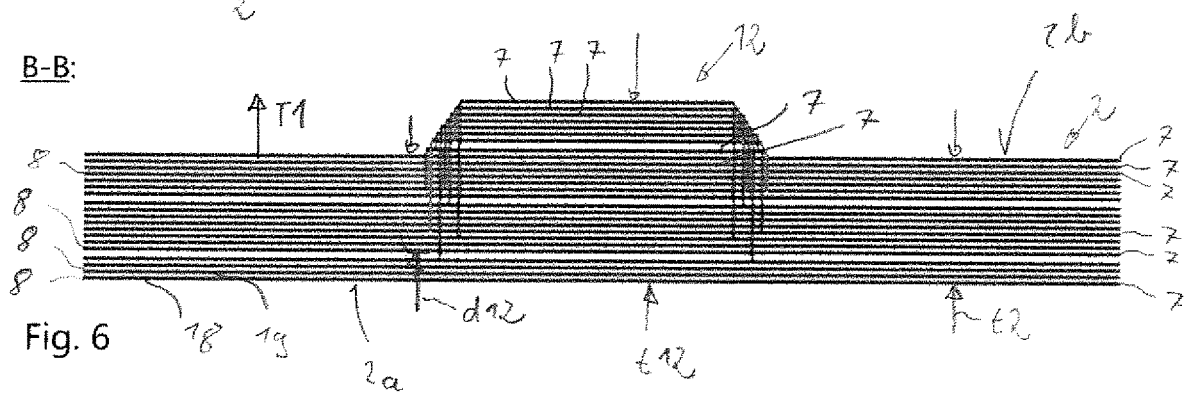
FIG. 6 is a sectional view of the embodiment of the structural component according to the invention, which is produced in a section along the line B-B drawn in FIG. 4.

The first and the second reinforcement parts 11, 12 may, as shown by way of example in FIGS. 5 and 6, be formed in each case by at least one fibre composite strip 7, known as a tow. A reinforcement part 11, 12 is for example formed by a plurality of fibre composite strips 7 lying one on top of the other and each having an extremely small thickness, as shown in FIG. 6. An individual fibre composite strip 7 in each case comprises a fibre layer which is surrounded by a matrix material.

Figure 7:
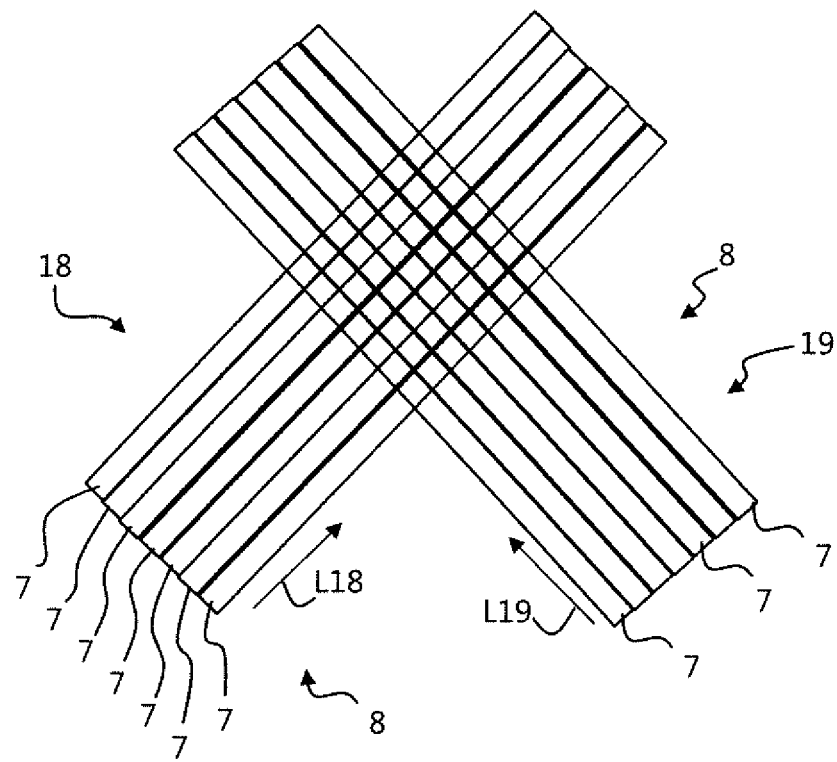
FIG. 7 is a schematic view of fibre composite material layers lying one on top of the other, by way of example, of a main body of the structural component.

The main body 2 may also be formed by at least two fibre composite material layers 8. In this case it may be provided, in particular, for the fibre composite material layers 8 of the main body 2 to be formed in each case by a plurality of fibre composite strips 7, as shown by way of example in FIGS. 5 to 7. As shown schematically in FIG. 7, it may in particular be provided in this case for the fibre composite strips 7 of a first fibre composite material layer 18 to extend in a first strip longitudinal direction L18, and for the fibre composite strips of a fibre composite material layer 19 located adjacently to the first fibre composite material layer 18 to extend in a second strip longitudinal direction L19, the first and the second strip longitudinal direction L18, L19 extending obliquely with respect to one another. In this manner, particularly stable planar components can be easily produced.

The reinforcement parts 11, 12 may, in particular, be embedded between two fibre composite layers 8, 18, 19 at least in part. In particular, individual fibre composite strips 8 may be located within the cross section of the main body 2, defined by the fibre composite layers 8, 18, 19, in relation to a component thickness direction T1, as shown by way of example in FIG. 6. In the example shown in FIG. 6, the reinforcement part 12 extends into the main body 2 to a depth d12.

In this manner, a particularly good connection of the main body 2 to the reinforcement parts 11, 12 is achieved, as a result of which the structural component 1 has a particularly high mechanical stability.

As an alternative to this, the reinforcement parts 11, 12 may be arranged on one of the surfaces 2a, 2b of the main body 2. The structural component 1 can thus be produced in a particularly simple manner.

Figure 4:
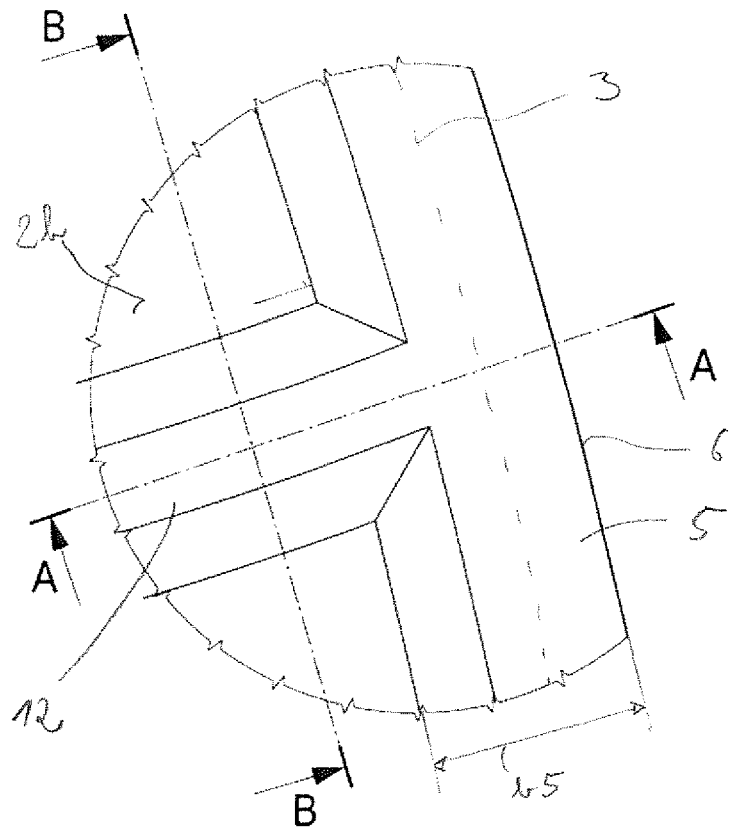
FIG. 4 is a detailed view of the region of the structural component shown in FIG. 3 which is denoted by the letter Z.

The reinforcement parts 11, 12 may, for example, have a rectangular, semi-circular, T-shaped, triangular or trapezoidal cross section. FIGS. 4 and 6 show, by way of example, a second reinforcement part 12 having a trapezoidal cross section.

It may furthermore be provided for the structural component 1 to have a peripheral terminal part 5. Said terminal part extends along the peripheral edge 3 of the main body 2 and is connected thereto. As shown in particular in FIG. 4, the peripheral edge 3 of the main body is located within the peripheral terminal part 5 in relation to a width b5 thereof, such the peripheral terminal part forms an edge 6 of the structural component 1. Since the peripheral edge 3 of the main body is located within the peripheral terminal part 5, the structural component 1 can advantageously be formed so as to have a constant thickness t5 in the region of the peripheral terminal part 5, as shown by way of example in FIG. 5. Different thicknesses t12 which result in the region of the reinforcement parts 11, 12, and thicknesses t2 of the structural component which are produced in regions without reinforcement parts 11, 12, are thus compensated by means of the peripheral terminal part 5. The structural component 1 is thus easy to mount on a fuselage structure, in particular on a pressure fuselage 50.

The peripheral terminal component 5, like the reinforcement parts, may be constructed from a plurality of fibre composite strips 7 that are connected and lie one on top of the other.

Figure 8:
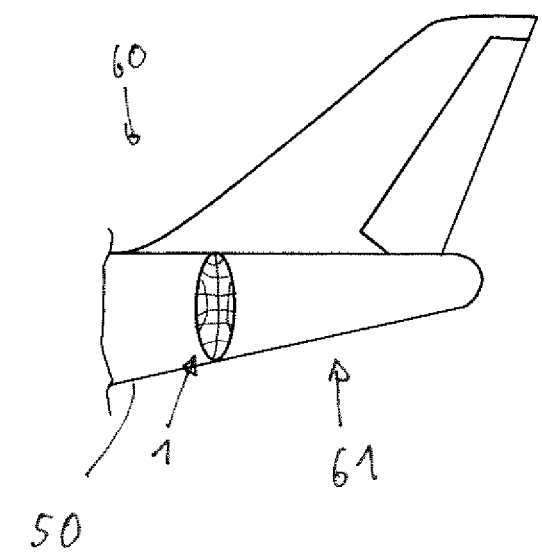
FIG. 8 shows an embodiment of a vehicle comprising a pressure fuselage according to the present invention.

FIG. 8 shows, by way of example, a pressure fuselage 50 for a vehicle 60, in this example an aircraft 61, according to the present invention. The pressure fuselage 60 comprises a structural component 1 which is formed in one of the ways described above.

FIG. 8 also shows, by way of example, a use according to the invention of a structural component 1 which is formed in one of the ways described above. Accordingly, the use of the structural component 1 in a pressure fuselage 50 of a vehicle 60, in particular in a pressure fuselage 50 of an aircraft 61, is provided.

Figure 9:
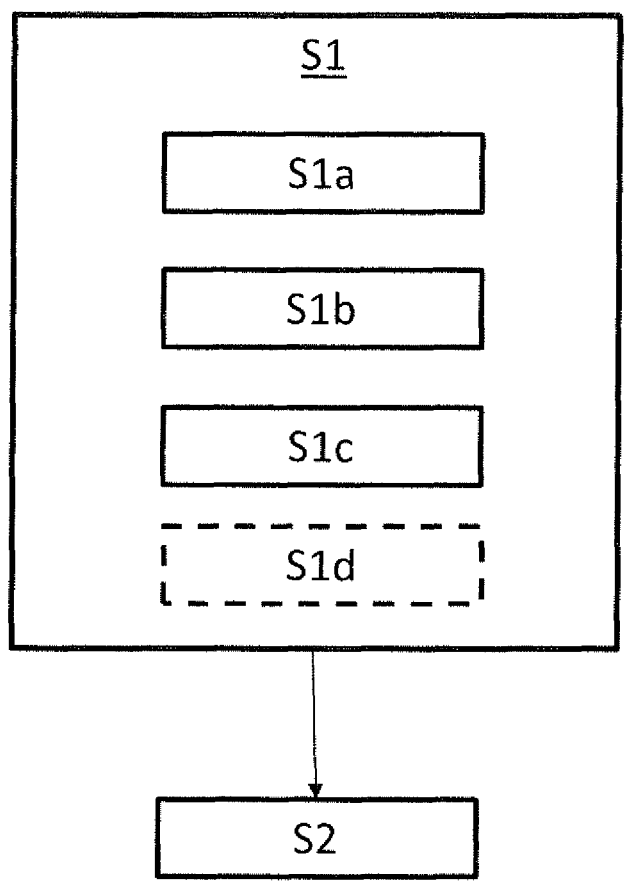
FIG. 9 is a schematic view of the sequence of steps of the method according to the invention.

FIG. 9 shows, by way of example, the sequence of a method for producing a structural component 1. The method has, in particular, a step S1 for forming a semi-finished product arrangement. This step S1 may, in particular, have the following sub-steps:

A first sub-step S1a comprises laying a fibre composite material semi-finished product, which comprises a fibre layer pre-impregnated with a matrix material, on a contour surface of a tool part, the surface course of which contour surface is such that the fibre composite material semi-finished product forms a domed main body arrangement having a peripheral edge and a vertex.

A second sub-step S1b comprises laying a plurality of first reinforcement parts on the fibre composite material in such a way that said parts in each case extend between two points of a first pair of points located in the peripheral edge so as to be spaced apart in a component peripheral direction in such a way that said parts in each case have a concave curvature course in relation to a first plane which extends in a first curvature direction produced at the vertex and through the curvature centre point thereof.

A further sub-step S1c comprises laying a plurality of second reinforcement parts on the fibre composite material in such a way that said parts extend in each case between two points of a second pair of points located in the peripheral edge so as to be spaced apart in a component peripheral direction in such a way that said parts have a concave curvature course in relation to a second plane which extends in a second curvature direction produced at the vertex and through the curvature centre point thereof.

The method furthermore has a second step S2, involving heating S2 the semi-finished product arrangement formed in step S1 under the application of pressure, and thereby hardening the matrix material to form a main body from the fibre composite material semi-finished product and to connect the first and the second reinforcement parts to the main body.

Step S1 may, in particular, have a further sub-step S1d which is carried out after laying on the second reinforcement parts and in which a further fibre composite material semi-finished product is laid on. The reinforcement parts 11, 12 can thereby be embedded in the cross section of the main body in part or completely, in particular between two adjacent fibre composite material layers 18, 19 of the main body 2.

The fibre composite material semi-finished product is for example laid on in step S1 by consecutively arranging at least two fibre composite material layers on the contour surface of the tool part.

In this case, it may in particular be provided for the fibre composite material layers 8, 18, 19 to be arranged in that a first fibre composite material layer 18 is formed by unrolling a plurality of fibre composite strips 7 in a strip longitudinal direction L18, and at least one further fibre composite material layer 19 follows this first fibre composite material layer 18 by unrolling a plurality of fibre composite strips 7 in such a way that the strip longitudinal direction L19 of the fibre composite strips 7 of the further fibre composite layer 19 extends in each case obliquely to the strip longitudinal direction L18 of the fibre composite strips 7 of the adjacent fibre composite material layer 18.

In particular, it may be provided for the plurality of first reinforcement parts to be laid on S1b and for the plurality of second reinforcement parts to be laid on S1c by unrolling at least one fibre composite strip 7 on the fibre composite material semi-finished product. Identical fibre composite strips can thus be used both to form the fibre composite material semi-finished product from which the main body 2 is formed, and to form the reinforcement parts 11, 12. As a result, the method can be carried out particularly efficiently.

On account of the above-described concave course of the reinforcement parts 11, 12, the fibre composite strips 7 having relatively large radii can be laid to form the reinforcement parts 11, 12. Consequently, wider strips or tows can be used without them producing folds. When using wider tows, the quantity of material deposited each time increases and at the same time, because of the higher strength of the wider tows for forming the reinforcement parts 11, 12, only a smaller number of tows is required for each reinforcement part 11, 12. Thus, the production time of the structural component 1 is reduced and, at the same time, a high component strength is achieved at a low weight.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural component configured for use in a pressure fuselage of a vehicle comprising:
a main body formed of a fibre composite material, a plurality of first reinforcement parts and a plurality of second reinforcement parts,
wherein the main body is formed as a domed body having a peripheral edge and a vertex,
wherein each of the plurality of first reinforcement parts is connected to the main body and extends between corresponding two points of a corresponding first pair of points located on the peripheral edge so as to be spaced apart in a component peripheral direction in such a way that each of the plurality of first reinforcement parts has a concave curvature course in relation to a first plane which extends in a first curvature direction produced at the vertex and through the curvature centre point thereof and of the vertex, each of the concave curvature courses of the plurality of first reinforcement parts extending toward the first plane, and
wherein each of the plurality of second reinforcement parts is connected to the main body and extends between corresponding two points of a corresponding second pair of points located in the peripheral edge so as to be spaced apart in the component peripheral direction in such a way that each of the plurality of second reinforcement parts has a concave curvature course in relation to a second plane which extends in a second curvature direction produced at the vertex and through the curvature centre point thereof and of the vertex, each of the concave curvature courses of the plurality of second reinforcement parts extending toward the second plane.

2. The structural component of claim 1, wherein a first vertex reinforcement part, which is formed by one of the plurality of first reinforcement parts, extends through the vertex of the main body, and a second vertex reinforcement part, which is formed by one of the plurality of second reinforcement parts, extends though the vertex of the main body.

3. The structural component of claim 1, wherein the first curvature direction is the first main curvature direction produced at the vertex, and the second curvature direction is the second main curvature direction produced at the vertex.

4. The structural component of claim 1, wherein the first and the second reinforcement parts in each case have a concave curvature course in relation to the first and the second plane in such a way that, in each case, two of a plurality of fields of the structural component which are in each case delimited by two second and two first reinforcement parts, in each case have surface areas which deviate from one another by at most 15 percent.

5. The structural component of claim 1, wherein the first and the second reinforcement parts in each case have a concave curvature course in relation to the first and the second plane in such a way that, in each case, two of a plurality of fields of the structural component which are in each case delimited by two second and two first reinforcement parts, in each case have surface areas which deviate from one another by at most 10 percent.

6. The structural component of claim 1, wherein the first and the second reinforcement parts in each case have a concave curvature course in relation to the first and the second plane in such a way that, in each case, two of a plurality of fields of the structural component which are in each case delimited by two second and two first reinforcement parts, in each case have surface areas which deviate from one another by at most 5 percent.

7. The structural component of claim 1, wherein each of the pluralities of first and the second reinforcement parts is formed by at least one fibre composite strip.

8. The structural component of claim 1, wherein the main body has at least two fibre composite material layers.

9. The structural component of claim 8, wherein the fibre composite material layers of the main body are in each case formed by a plurality of fibre composite strips extending in a strip longitudinal direction, wherein the strip longitudinal direction of the fibre composite strips of a first fibre composite material layer extends obliquely to the strip longitudinal direction of the fibre composite strips of an adjacent fibre composite layer.

10. The structural component of claim 8, wherein the pluralities of first and second reinforcement parts are embedded between two fibre composite layers at least in part.

11. The structural component of claim 1, wherein the pluralities of first and second reinforcement parts are arranged on a surface of the main body.

12. The structural component of claim 1, wherein the structural component has a peripheral terminal part which extends along the peripheral edge of the main body and is connected thereto in such a way that the peripheral edge of the main body is located within the peripheral terminal part in relation to a width thereof, such the peripheral terminal part forms an edge of the structural component.

13. A method for producing a structural component configured for use in a pressure fuselage of a vehicle, the method comprising:
    forming a semi-finished product arrangement by
    laying a fibre composite material semi-finished product, which comprises a fibre layer pre-impregnated with a matrix material, on a contour surface of a tool part, the surface course of which contour surface is such that the fibre composite material semi-finished product forms a domed main body arrangement having a peripheral edge and a vertex,
    laying a plurality of first reinforcement parts on the fibre composite material in such a way that each of the plurality of first parts extends between corresponding two points of a corresponding first pair of points located in the peripheral edge so as to be spaced apart in a component peripheral direction in such a way that each of the plurality of first reinforcement parts has a concave curvature course in relation to a first plane which extends in a first curvature direction produced at the vertex and through the curvature centre point thereof, each of the concave curvature courses of the plurality of first reinforcement parts extending toward the first plane, and
    laying a plurality of second reinforcement parts on the fibre composite material in such a way that each of the plurality of second reinforcement parts extends between corresponding two points of a corresponding second pair of points located in the peripheral edge so as to be spaced apart in a component peripheral direction in such a way that each of the plurality of second reinforcement parts has a concave curvature course in relation to a second plane which extends in a second curvature direction produced at the vertex and through the curvature centre point thereof, each of the concave curvature courses of the plurality of second reinforcement parts extending toward the second plane; and
    heating the semi-finished product arrangement under the application of pressure, and thereby hardening the matrix material to form a main body from the fibre composite semi-finished product and to connect the first and second reinforcement parts to the main body.

14. The method of claim 13, wherein, when forming the semi-finished product arrangement, after laying on the plurality of second reinforcement parts a further fibre composite material semi-finished product is laid on.

15. The method of claim 13, wherein the fibre composite material semi-finished product is laid on by consecutively arranging at least two fibre composite material layers on the contour surface of the tool part.

16. The method of claim 15, wherein the fibre composite material layers are arranged in that a first fibre composite material layer is formed by unrolling a plurality of fibre composite strips in a strip longitudinal direction and at least one further fibre composite material layer follows this first fibre composite material layer by unrolling a plurality of fibre composite strips in such a way that the strip longitudinal direction of the fibre composite strips of the further fibre composite layer extends in each case obliquely to the strip longitudinal direction of the fibre composite strips of the adjacent fibre composite material layer.

17. The method of claim 13, wherein the plurality of first reinforcement parts is laid on and the plurality of second reinforcement parts is laid on by unrolling at least one fibre composite strip on the fibre composite material semi-finished product.

18. A pressure fuselage for a vehicle comprising:
    a structural component with a main body formed of a fibre composite material, a plurality of first reinforcement parts and a plurality of second reinforcement parts,
    wherein the main body is formed as a domed body having a peripheral edge and a vertex,
    wherein each of the plurality of first reinforcement parts is connected to the main body and extends between corresponding two points of a corresponding first pair of points located on the peripheral edge so as to be spaced apart in a component peripheral direction in such a way that each of the plurality of first reinforcement parts has a concave curvature course in relation to a first plane which extends in a first curvature direction produced at the vertex and through the curvature centre point thereof and of the vertex, each of the concave curvature courses of the plurality of first reinforcement parts extending toward the first plane, and
    wherein each of the plurality of second reinforcement parts is connected to the main body and extends between corresponding two points of a corresponding second pair of points located in the peripheral edge so as to be spaced apart in the component peripheral direction in such a way that each of the plurality of second reinforcement parts has a concave curvature course in relation to a second plane which extends in a second curvature direction produced at the vertex and through the curvature centre point thereof and of the vertex, each of the concave curvature courses of the plurality of second reinforcement parts extending toward the second plane.

\* \* \* \* \*